United States Patent

[11] 3,588,696

| [72] | Inventors | Jean Solvay<br>68, avenue de l'Oiseau Bleu;<br>Henri Solvay, 296, avenue Moliere,<br>Brussels, Belgium |
|---|---|---|
| [21] | Appl No | 768,796 |
| [22] | Filed | Oct. 18, 1968 |
| [45] | Patented | June 28, 1971 |
| [32] | Priority | Nov. 21, 1967 |
| [33] | | Luxembourg |
| [31] | | 54,931 |

[54] DEVICES FOR MONITORING A PHYSICAL QUANTITY
15 Claims, 19 Drawing Figs.

[52] U.S. Cl. .................................................. 324/121,
250/217, 324/77, 340/149
[51] Int. Cl. ..................................................... G01r 13/20,
H01j 39/12
[50] Field of Search............................................324/121, 77
(A), 88; 235/198; 315/21, 23; 340/149; 250/217,
217 (CRT)

[56] References Cited
UNITED STATES PATENTS

| 1,977,999 | 10/1934 | Prinz........................... | 235/198 |
| 2,527,512 | 10/1950 | Arditi.......................... | 315/21X |
| 2,933,255 | 4/1960 | Kohl............................ | 235/198 |
| 2,994,779 | 8/1961 | Brouillette, Jr............... | 235/198X |
| 3,257,652 | 6/1966 | Foster ......................... | 340/149X |

*Primary Examiner*—Rudolph V. Rolinec
*Assistant Examiner*—Ernest F. Karlsen
*Attorney*—Spencer and Kaye

ABSTRACT: A device for monitoring a physical quantity by producing, on the screen of a cathode-ray tube, a trace composed of a succession of light spots forming a curve representing variations in the value of the quantity being monitored, disposing in front of the screen an opaque mask provided with a slit whose form corresponds to the path along which the trace lies when the physical quantity has the desired value and whose width is proportional to the acceptable variations in the value of the quantity, and disposing a photoelectric cell in front of the mask for detecting the light spots whenever they appear within the opening defined by the slit.

INVENTORS
Jean Solvay
Henri Solvay

BY *Spencer & Kaye*

ATTORNEYS

INVENTORS
Jean Solvay
Henri Solvay
BY Spencer & Kaye
ATTORNEYS

INVENTORS
Jean Solvay
Henri Solvay

BY *Spencer & Kaye*

ATTORNEYS

DEVICES FOR MONITORING A PHYSICAL QUANTITY

BACKGROUND OF THE INVENTION

The present invention relates to the observation of a physical quantity, and particularly to the production of an electrical quantity representing such physical quantity.

It is a common practice in scientific and technical work to derive a representation of a physical quantity by first producing an electrical quantity representative of such physical quantity and by then applying the electrical quantity to indicating or recording devices in order to provide, at each instant, an indication of the value of the physical quantity being observed. This procedure is followed, for example, for observing, monitoring, or detecting pressures, temperatures, fluid levels, the operating parameters of electric motors, internal combustion engines, etc. It is also applicable to the detection of electrical quantities which are generally transformed into other electrical quantities of the same or of a different type.

The resulting indication or record of the representative electrical quantity is examined by an operator whose task is to determine the permissible deviations of the quantity being observed from a given value. This given value could be a fixed value from which the measured quantity can not deviate or the measured value could be permitted to deviate only within accurately defined limits. The given, or reference, value could also be variable with respect to time.

This type of observation of the electrical quantity does not present great difficulties when the physical quantity being monitored varies only occasionally and/or slowly with respect to time.

On the other hand, when it is desired to monitor physical quantities which vary frequently and/or quite rapidly with respect to time, they can be accurately observed only by means of recording devices producing a record which is examined at a later time in order to determine whether any unacceptable and unforeseen deviations have occurred. This procedure is particularly time consuming because it is necessary to examine a record which covers a time period whose length is such that there will be a sufficiently high probability that some such error would have had an opportunity to occur.

This is particularly true when the physical quantity to be monitored varies cyclically with respect to time. This might occur, for example, during the monitoring of the operation of internal combustion engines, or the function of the human heart, etc., where the variations of the physical quantity during one cycle are extremely rapid and where it often occurs that, when a malfunction is suspected, the majority of the cycles are normal and the malfunction appears in only one or a few cycles.

In these cases, the monitoring operation is difficult because it requires a determination of whether abnormal cycles have occurred. Moreover, these cycles are often distributed more or less randomly among the normal cycles.

The difficulties involved in this type of monitoring also exist when it is desired to determine, in certain cases, whether transitory abnormal variations have occurred and this also often requires the monitoring to be performed for long periods of time.

SUMMARY OF THE INVENTION

It is a primary object of the present invention to overcome these drawbacks and difficulties.

Another object of the invention is to substantially facilitate such monitoring operations.

Still another object of the invention is to permit the value of a physical quantity to be automatically monitored so as to reliably provide an indication of a deviation which exists for a short time during a long monitoring period.

These and other objects according to the invention are achieved by the provision of novel apparatus for monitoring at least one physical quantity which is represented by an electrical quantity. This apparatus essentially includes a cathode ray tube having a screen and arranged to produce an electron beam and to control such beam so as to produce, upon the screen, a trace representing the physical quantity, the apparatus also including an opaque mask disposed in front of the screen and provided with a slit whose form corresponds to the path which the trace will follow across the screen for the desired value of the physical quantity and whose width corresponds to the deviations of the trace from this path due to the maximum acceptable variations of the physical quantity from its desired value. The apparatus further includes a voltage generator whose output voltage frequency is higher than the frequency at which the beam is deflected across the screen, the generator being connected to the tube for modulating the intensity of the beam, and a photoelectric cell disposed in front of the mask for detecting the trace whenever it appears within the opening defined by the slit.

According to preferred embodiments of the invention, the output from the voltage generator is in the form of a train of pulses.

The apparatus according to the invention is particularly useful for monitoring quantities which vary cyclically. For monitoring such a quantity, its successive cycles are caused to appear on the screen, in a known manner, in the form of a repetitive wave. The slit formed in the mask is given precisely the form which the wave should have when the quantity being monitored varies in the desired manner during each cycle. So long as the quantity maintains its normal value, the entire trace will appear in the opening defined by the slit. Since the electron beam is subjected to an intensity modulation, the photoelectric cell disposed in front of the mask will detect all of the beam modulations as long as the physical quantity varies in the desired manner. On the other hand, if the physical quantity should deviate from its desired value at any point during a cycle, the corresponding portion of the trace will not appear in the slit opening and will not be detected by the photoelectric cell during one or several cycles of the intensity modulation applied to the beam. The output from the photoelectric cell could be connected to any detection circuit which will produce an output when a portion of the trace is not detected by the cell.

The same result can be achieved for transient physical quantities, i.e. quantities which do not vary cyclically.

It should be readily appreciated that apparatus according to the invention could be readily utilized for the monitoring of physical quantities which vary slowly or which are to be invariable with respect to time.

DESCRIPTION OF THE PREFERRED EMBODIMENTS

Figure 1:
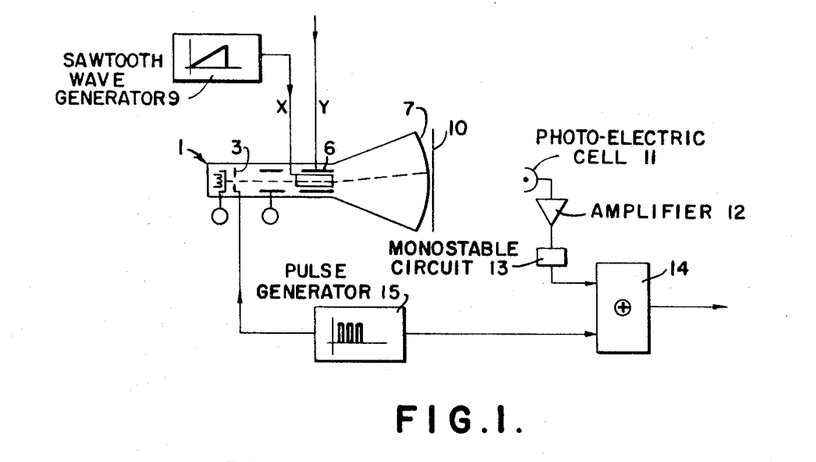
FIG. 1 is a simplified circuit diagram of one preferred embodiment of the present invention.

FIG. 1 shows a first embodiment of apparatus according to the invention which includes a cathode-ray tube, generally designated 1, provided with the usual components such as a heater and cathode 2, a control grid 3, an accelerating grid 4, horizontal deflection plates 5 for deflecting the beam parallel to the X-axis, vertical deflection plates 6 for deflecting the beam parallel to the Y-axis, and the fluorescent screen 7. The cathode-ray tube is also provided with a focusing system which is not shown here for purposes of simplicity. The electron deflection and focusing systems of the tube act on the electron beam 8 to focus it upon, and control its deflection across, the fluorescent screen 7.

The horizontal deflection plates 5 are connected to the output of a sawtooth wave generator 9 producing a sawtooth sweep signal whose frequency is suitably chosen with reference to the rate of variation of the phenomenon to be studied or is controlled by such phenomenon, this being carried out in a manner which is well known in the cathode-ray tube art. The sawtooth waves produced by generator 9 will cause the beam 8 to be deflected horizontally across the face of screen 7 once during each sawtooth wave cycle, the beam traversing the screen at a constant rate in one direction and then being returned in the opposite direction at a rate which is sufficiently high to substantially prevent the beam from producing any visible trace on the screen during its return travel.

The vertical deflection plates 6 are connected to receive the electrical signal whose amplitude is representative of the physical quantity to be observed.

In front of the screen 7 is disposed an opaque mask 10 provided with a slit whose configuration corresponds to the curve which the beam 8 will follow when the electrical signal applied to vertical deflection plates 6 varies in the desired manner during each horizontal deflection period.

Figure 2:
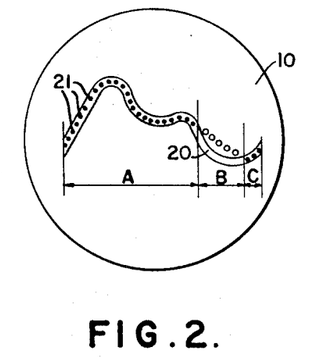
FIG. 2 is a pictorial view of one form of construction of a mask utilized in the apparatus of FIG. 1.

One form of construction for such a mask is shown in FIG. 2 wherein the mask is provided with a slit 20 which encompasses the normal path of the beam. Such a mask could be obtained very easily by photographing the screen 7 during a complete sweep cycle while the vertical plates 6 are receiving an electrical signal having the normal, or desired, waveform.

For monitoring the trace produced on screen 7, there is provided a photoelectric cell 11 arranged to face the mask 10 and to provide an output signal to an amplifier 12 feeding a monostable circuit 13. The output of the monostable circuit is connected to one input of an Exclusive-OR circuit 14. The other input to circuit 14 is connected to one output of a pulse generator 15 having an output pulse rate of the order of 1 kHz.

The pulses from this generator are also applied to the control electrode 3 of cathode-ray tube 1 for amplitude modulating beam 8. The pulse rate of generator 15 is selected, in accordance with the physical quantity which is to be observed, to be substantially higher than the horizontal beam deflection rate and can be between 300 Hz. and 20 kHz.

In operation, the application of a sawtooth voltage to horizontal plates 5 and the synchronized application of the voltage representing the quantity to be observed to vertical deflection plates 6 causes the beam 8 to produce on screen 7 a trace whose waveform represents the variation of the quantity to be observed with respect to time. Because the voltage on control grid 3 is constituted by a train of pulses, the trace appearing on screen 7 will not be in the form of a continuous line but will rather be constituted by a series of points, or spots, as indicated at 21 in FIG. 2 the beam being blanked between such points.

When the points constituting the electron beam trace are within the opening defined by the slit 20 in mask 10, as is the case for the zones A and C of FIG. 2, cell 11 will detect them and will produce output pulses which will be amplified by amplifier 12, the output pulses from amplifier 12 being applied to activate monostable circuit 13 to cause this circuit to apply a corresponding train of pulses to Exclusive-OR circuit 14. Since each pulse thus produced by circuit 13 will be in time coincidence with a pulse delivered from generator 15 to the other input of circuit 14, the latter circuit will not produce an output at these times.

On the other hand, when the trace on screen 7 is not in registry with slit 20, as occurs over the region B shown in FIG. 2, cell 11 will not sense the points produced on the screen 7 and the monostable circuit 13 will not produce any output pulses. Each pulse applied by generator 15 to circuit 14 during this period will result in an error signal at the output of circuit 14. Thus circuit 14 is arranged to detect an absence of light spots in the opening defined by the mask slit.

Thus, the production of an output signal by Exclusive-OR circuit 14 constitutes an indication that the quantity being observed does not have the desired waveform, or value, and this output signal could be used in various ways, for example, for activating an alarm or a visual signal, or for feeding an integrator which will only deliver an output signal when the number of output pulses produced by circuit 14 exceeds a predetermined value.

It may be noted that the slit 20 in the mask of FIG. 2 has a uniform width. Alternatively, the mask could be provided with a slit of varying width, as shown, for example, for the slit of the mask illustrated in FIG. 3. In this FIG., the broken line 30 represents the desired waveform for the quantity being observed. The two sides 31 and 32 of the slit do not extend parallel to this curve and the spacing between the curve and the sides of the slit at any point along the slit is selected to correspond to the permissible variations between the actual waveform and the desired waveform.

Figure 3:
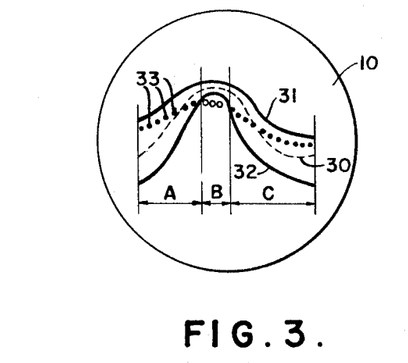
FIG. 3 is a view similar to that of FIG. 2 showing another form of construction for such mask.

By way of example, FIG. 3 shows a train of spots 33 representing the waveform of a quantity being observed. While this series of spots does not follow the curve 30, the curve represented by the spots 33 corresponds sufficiently to the desired value across the regions A and C. However, across the region B the value of the quantity being observed is unacceptably low. As a result, for the portions of the cathode-ray tube trace extending across regions A and C, the photoelectric cell 11 will sense the light spots 33 produced on the screen, so that no output will be produced by the Exclusive-OR circuit, while this circuit will produce output pulses during the period when the trace is traversing the region B.

Figure 4:
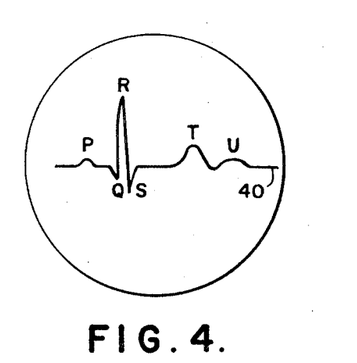
FIG. 4 is a pictorial view of one type of display which could appear on the screen of the apparatus of FIG. 1.

FIG. 4 is a pictorial view of a cathode-ray tube screen on which appears a trace representing the result of an electrocardiogram examination. This represents one specific example of a utilization of the apparatus according to the invention. The trace shown is constituted by pulsations P, Q, R, S, T and U, whose amplitudes are taken with respect to the reference level 40.

In certain cases, it is necessary or desirable to examine more closely only a portion of the total trace, for example, the portion which includes the pulsations T and U, and to evaluate only this portion of the trace. By suitably increasing the horizontal sweep velocity, i.e. the rate of change of the sawtooth voltage applied to the horizontal deflection plates of the cathode-ray tube, while adjusting the horizontal sweep repetition rate and synchronization to remain synchronized with the repetition rate of the quantity being monitored, it is possible to cause only the portion of the electrocardiogram trace which is of interest to appear on the cathode-ray tube screen.

Such a procedure for expanding the curve under consideration could not be employed in conjunction with the apparatus of FIG. 1 because the time periods during which portions of the total curve not under consideration, and not appearing on the screen, occur would produce the same result as if a portion of the curve under consideration did not appear in the slit associated with the mask and hence would result in the production of an output from the Exclusive-OR circuit indicating a deviation from the desired curve configuration.

To overcome this difficulty, and for other purposes, apparatus according to the invention could be provided with a multiple beam tube in place of the single beam tube shown in FIG. 1.

Figure 6:
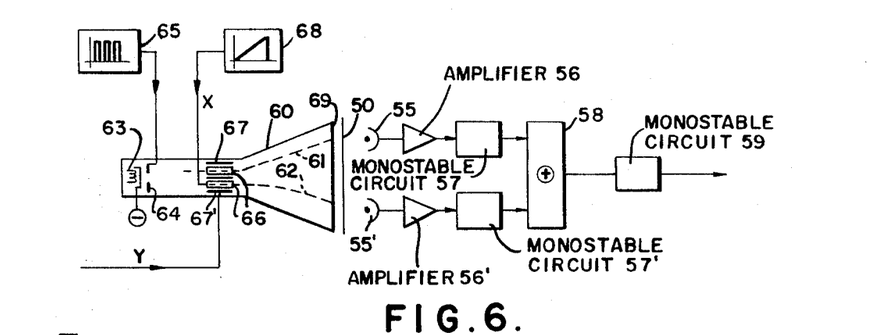
FIG. 6 is a schematic diagram of another embodiment of the invention.

Thus, for permitting only a portion of the cycle of a physical quantity to be monitored, use is made of the arrangement shown in FIG. 6 which employs a double beam cathode-ray tube 60 whose two beams 61 and 62 are individually deflectable by separate sets of horizontal deflection plates 66 and vertical plates 67 and 67'. The tube includes the usual cathode 63 and control grid 64, the control grid being connected to receive pulses from generator 65, which is comparable to the generator 15 of FIG. 1.

The horizontal, or X-axis, deflection plates 66 are driven by the horizontal sweep generator 68 which corresponds to the generator 9 of FIG. 1 but which is of a type whose voltage excursion can be adjusted and synchronized with the signal which is to be monitored.

The vertical deflection plates 67 for controlling beam 61 are connected (connection not shown) to receive a DC voltage having a constant value, while the deflection plates 67' for controlling beam 62 are connected to receive the voltage Y to be studied.

Figure 5:
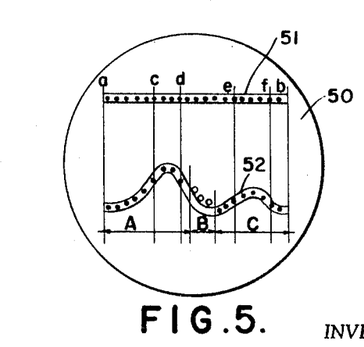
FIG. 5 is a pictorial view of one form of construction of a mask used in the apparatus of FIG. 6.

In front of the cathode-ray tube screen 69 is disposed a mask 50 which is shown in detail in FIG. 5. This mask is provided with two slits, a straight horizontal slit 51 and an undulating slit 52 whose form corresponds to the desired configuration of the quantity portion associated with pulsations T and U. The two slits extend between the same vertical lines $a$ and $b$.

Placed in front of each slit is a respective photoelectric cell 55 or 55', the cell 55 being associated with slit 51 and the cell 55' being associated with the slit 52. Each cell is disposed so as to be responsive only to light spots appearing in the opening defined by its associated slit and each cell is connected via a respective amplifier 56 or 56' to a respective monostable circuit 57 or 57'. The outputs of the two monostable circuits are connected to the two inputs of an Exclusive-OR circuit 58 whose output is delivered to some utilization device via another monostable circuit 59.

In operation, during those periods when the amplitude of the horizontal sweep voltage is such that no trace appears upon the screen 59, this corresponding to the portions of the measured quantity which are not to be examined, no light spot will appear in either of the slits 51 and 52. As a result, neither of the light cells will produce any output pulse and the Exclusive-OR circuit 58 will not produce any output.

On the other hand, during the time interval corresponding to the portion of the measured quantity which is to be examined, the beams 61 and 62 will produce traces on the screen 69 in the region between the vertical lines $a$ and $b$ of mask 50. If the waveform of this portion of the measured quantity has the desired value, the trace produced by beam 62 will coincide with the configuration of slit 52 so that the succession of light spots produced by beam 62 will appear in the opening defined by slit 52. Such is the case for the slit portions A and C illustrated in FIG. 5.

Since the voltage applied to the deflection plates 67 is constant and has a value such as to cause the beam 61 to always produce light spots in the opening defined by slit 51, each light spot appearing in the opening of slit 52 will coincide with a light spot produced in the opening of slit 51 due to the fact that both beams are amplitude modulated by the same generator 65. Thus, as long as the light spots produced by beam 62 are in the opening defined by slit 52, both photoelectric cells 55 and 55' will deliver simultaneous output pulses and hence will prevent circuit 58 from producing any output.

However, when the waveform of the measured quantity does not coincide with the desired value, such as occurs over the slit portion B shown in FIG. 5, no light pulses will be sensed by photoelectric cell 55'. Since only the photoelectric cell 55 is then delivering light pulses, only one input of circuit 58 will receive signal pulses from circuit 57 and circuit 58 will therefore produce output signals indicating that the measured waveform deviates from the desired configuration.

The principles of the invention could also be extended to permit the simultaneous examination of several quantities by utilizing a cathode-ray tube of the type which produces a plurality of individually deflectable beams. Such a tube could be associated with a mask having a plurality of slits, there being one slit for each beam, and at least one of the beams could be associated with a straight line slit while the other beams are associated with slits each of which is shaped in accordance with the waveform of one quantity to be observed. Such an arrangement would include one photoelectric cell associated exclusively with each slit.

In the case of an arrangement employing the mask shown in FIG. 5, it is also possible, for example, to monitor only the peak portions of the pulsations T and U. This could be accomplished by providing, in place of the continuous slits 51 and 52, segmented slits extending only between vertical lines $c$ and $d$ and between vertical lines $e$ and $f$, the regions between lines $a$ and $c$, lines $d$ and $e$ and lines $f$ and $b$ being opaque. Thus, each segmented portion of the slit corresponding to slit 52 would have an associated equal length segmented portion of the slit corresponding to slit 51. Such a modification could also be employed for the monitoring of a plurality of physical quantities each controlling the deflection of one of a plurality of electron beams.

In each such embodiment, the error detection circuit for each quantity is preferably constituted by an Exclusive-OR circuit.

Figure 7:
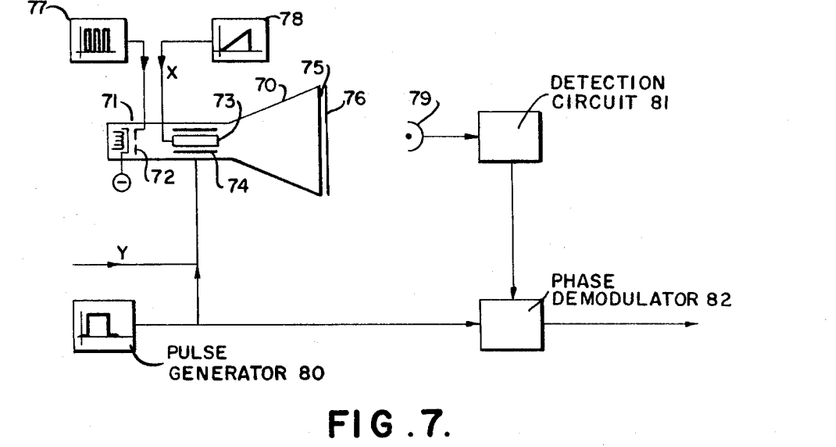
FIG. 7 is a schematic diagram of a further embodiment of the invention.

Turning now to the embodiment of FIG. 7, there is shown another embodiment of apparatus according to the invention which is similar to that shown in FIG. 1 but which differs therefrom in that it includes a supplemental element and a different type of circuit for analyzing the output of the photoelectric cell, the arrangement shown in FIG. 7 being constructed to permit a more sensitive monitoring operation to be performed.

The embodiment shown in FIG. 7 includes a cathode-ray tube 70 having the usual cathode 71 and control grid 72, as well as horizontal deflection plates 73 and vertical deflection plates 74. The control grid 72 is again connected to receive pulses from a generator 77 and the horizontal deflection plates 73 are connected to the output of a sawtooth wave generator 78 producing suitably synchronized sawtooth waves. Facing the screen 75 of the tube is a mask 76 provided with a single slit and a photoelectric cell 79 is disposed in front of the mask. The cell 79 is arranged to deliver output pulses in response to light pulses appearing in the opening defined by the slit formed in mask 76.

The apparatus also includes a square wave pulse generator 80 whose pulse repetition rate is lower than that of generator 77. The output voltage from generator 80 is connected so as to be superimposed on the electric signal Y representing the quantity to be monitored. The sum of these two voltages is applied to the vertical deflection plates 74.

The voltage amplitude of the square wave pulses delivered by generator 80 is preferably selected so as to cause the light spots produced on screen 75 by the electron beam to be deflected by an amount which is just equal to the width of the slit provided in mask 76, this resulting in the highest error sensitivity attainable. The square wave produced by generator 80 will thus have the effect of causing the light spots appearing on screen 75, when the signal Y has the desired waveform so that by itself it would cause the light spots to be centered with respect to one edge, e.g. the lower edge, of the slit formed in mask 76, to be aligned with the other edge of the slit during the occurrence of each square wave pulse from generator 80 and to be aligned with the one edge of the slit during the time intervals between successive square wave pulses. Thus, the rate at which the locations of the spots is shifted from one slit edge to the other is equal to the repetition rate of generator 80.

Figure 8:
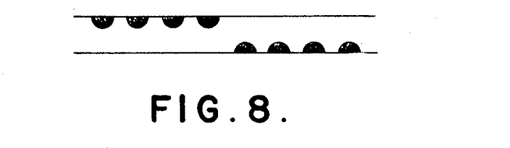
FIG. 8 is a pictorial view of a portion of the cathode-ray tube display associated with the apparatus of FIG. 7.

The positions of the light spots with respect to the mask slit are shown in FIG. 8 for one period of the output from generator 80.

The corresponding pulses produced at the output of photoelectric cell 79 are applied to a detection circuit 81 and the detected voltage is applied to a phase demodulator circuit 82 which also receives the output from the generator 80.

Figure 9A:
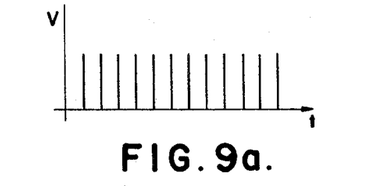
FIGS. 9a and 9b are voltage vs. time diagrams used in explaining the operation of the device of FIG. 7.

In operation, so long as the voltage being observed maintains its desired waveform, the light spots retain the positions shown in FIG. 8 and the output of cell 79 is constituted by a series of constant amplitude pulses, as is shown in FIG. 9a. This series of pulses produces a constant amplitude voltage at the output of circuit 81, with the result that no signal will appear at the output of phase demodulator 82.

However, when the signal being observed deviates from the desired value, for example if it should decrease, there will appear in the opening defined by the mask slit a larger proportion of each light spot produced during the occurrence of a square wave pulse from generator 80 and a smaller proportion of each light spot produced during the intervals between those pulses.

Figure 9B:
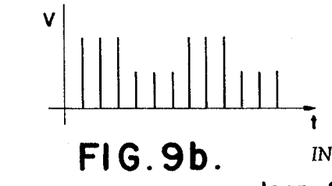

As a result, photoelectric cell 79 will no longer produce equal amplitude pulses, but the pulse amplitudes will vary at a frequency equal to the pulse rate of generator 80. The resulting output from photoelectric cell 79 is illustrated in FIG. 9b.

Thus, at the output of detection circuit 81 there will appear a square wave signal whose peak-to-peak variation is proportional to the deviation of the measured quantity from its desired value. This square wave signal will yield, in combination with the output signal from generator 80, an output signal from demodulator 82 which indicates the amplitude and direction of the deviation in the measured quantity.

According to another embodiment of the invention, an increased sensitivity is also obtained by superimposing on the horizontal sweep voltage and the vertical deflection voltage representing the quantity being monitored additional sinusoidal voltages which are related to each other in such a way as to impart a circular component to the trace appearing on the cathode-ray tube screen. The diameter of the circles produced thereby is preferably greater than the width of the mask slit. For detecting the deviations in the physical quantity from its desired value and the magnitudes of these deviations, the output of the associated photoelectric cell is applied to an AND circuit through the intermediary of a detection circuit, the AND circuit also receiving the output voltage from a threshold detector circuit whose input is connected to receive one of the sinusoidal deflection voltages.

Figure 10:
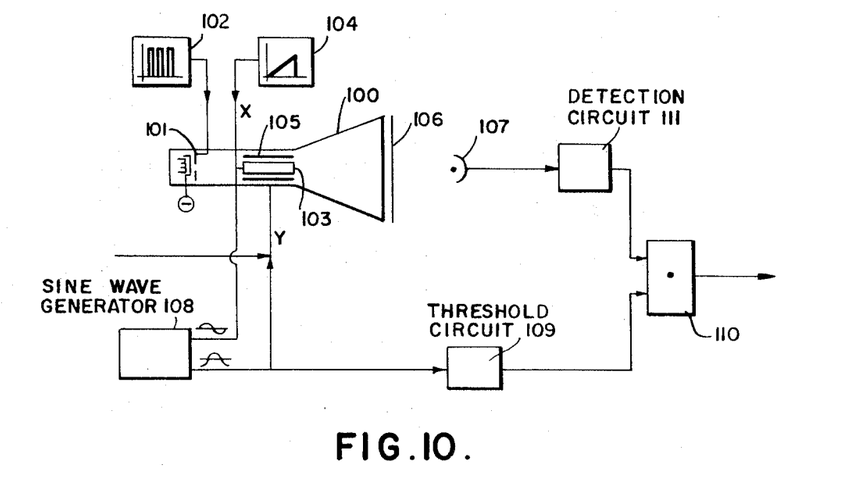
FIG. 10 is a circuit diagram of yet another embodiment of the invention.

FIG. 10 shows such an embodiment of the present invention which serves to provide an increase in the sensitivity of the measuring operation. The apparatus as shown in FIG. 10 includes a cathode-ray tube 100 which, as in the embodiment of FIG. 7, has its control grid 101 connected to the output of a pulse generator 102 comparable to the pulse generator 77 of FIG. 7. The horizontal deflection plates 103 are supplied with a sawtooth sweep voltage provided by generator 104, while the vertical deflection plates are provided with a voltage representing the quantity to be studied. Facing the cathode-ray tube screen are a mask 106 and a photoelectric cell 107.

In addition, for producing a circular sweep, there is provided a generator 108 producing two sinusoidal outputs which are phase shifted by 90° with respect to one another, one output being connected to the horizontal deflection plates 103 and the other output being connected to the vertical deflection plates 105. The amplitudes of these sinusoidal voltages are preferably selected to cause the trace produced on the cathode-ray tube screen to describe a circle centered on the point which the cathode-ray spot would normally occupy if the sinusoidal voltages were not present.

Figure 11A:
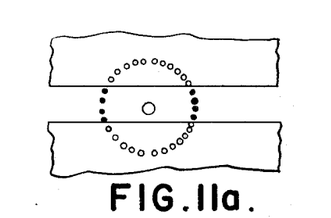
FIGS. 11a and 11b are pictorial views of two different cathode-ray tube displays produced by the apparatus of FIG. 10.

FIG. 11a shows, with respect to the slit opening, the resulting circular trace for one complete cycle of the sine wave outputs from generator 108. The dark spots of this circular trace are those which appear in the slit opening while the white spots are those which are hidden from the photoelectric cell by the mask 106. The white spot in the center of the circle represents the trace which would be produced by the signal being observed if the sinusoidal modulating voltages were not applied to the deflection plates.

Since it is desired to replace each light spot along the curve beam trace by a circle of such spots, it is necessary that the output pulse rate of generator 102 be higher than that of the generators shown in the preceding FIGS. In addition, the frequencies of the sinusoidal waves produced by generator 108 must be substantially higher than the repetition rate of the sawtooth waves produced by generator 104 in order to cause a series of circles to be produced across the cathode-ray tube face. If the sinusoidal wave frequencies are substantially higher than the sawtooth wave repetition rate, the trace appearing on the screen approximates a train of circles. However, because the sawtooth wave produced by generator 104 continually advances the cathode-ray beam across the tube screen, the resulting trace will actually be helical in nature and will have the form of a curtate cycloid.

One of the sinusoidal voltages produced by generator 108 is delivered to a monostable threshold circuit 109 whose output is connected to one input of an AND circuit 110. The second input of the AND circuit is connected to the output of a detection circuit 111 which is controlled by the pulses produced by photoelectric cell 107.

In operation, when the value of the signal being observed is such that the resulting cathode-ray spot would, in the absence of the auxiliary voltages produced by generator 108, be centered between sides of the slit formed in mask 106, the occurrence of the circle of spots produced by the application of the sinusoidal voltage will cause the cell 107 to deliver a succession of pulse groups, with each pulse group being associated with the passage of the sinusoidal wave applied to threshold circuit 109 through its zero value and with each pulse group being centered, with respect to time, about its associated sinusoidal wave zero crossing.

Figure 12A:
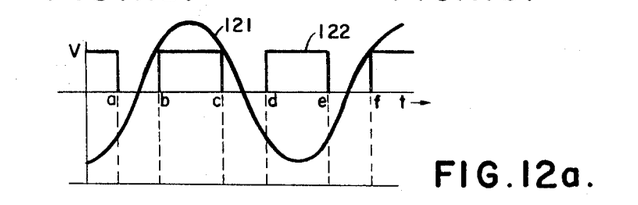
FIGS. 12a, 12b and 12c are voltage vs. time diagrams used in explaining the operation of the apparatus of FIG. 10.

The sinusoidal wave applied to threshold circuit 109 is represented by the wave 121 shown in FIG. 12a. Also shown in FIG. 12a is the resulting square wave output signal 122 from circuit 109. The conduction threshold level of circuit 109 is selected so as to cause the square wave pulses from circuit 109 to occur entirely between the successive pulse groups appearing at the output of cell 107 when the quantity being observed has precisely its desired value, the locations of the pulse groups under these conditions being shown in FIG. 12b.

Figure 12B:
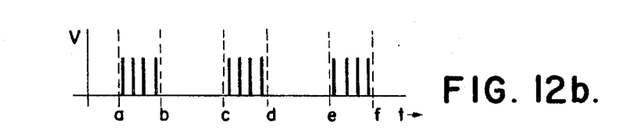

Thus, when the voltage being observed has precisely the desired value, so that the resulting circle of spots will be oriented with respect to the slit opening in the manner shown in FIG. 11a, the pulses 122 applied to one input of AND circuit 110 will never coincide with the pulses applied to the other input of the AND circuit, as illustrated by a comparison of FIGS. 12a and 12b, so that circuit 110 will not produce any output.

Figure 11B:
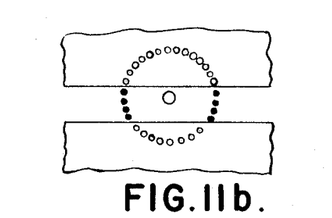
Figure 12C:
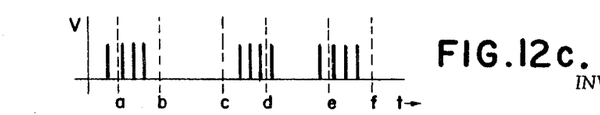

However, if the value of the quantity being observed should increase slightly, the corresponding circle of spots will be displaced upwardly, as shown in FIG. 11b, so that each pulse group produced by cell 107 will no longer be symmetrically disposed with respect to its associated sinusoidal wave zero crossing. The times of occurrence of these pulse groups with respect to the sinusoidal wave, and with respect to the square wave pulses produced by circuit 109, are illustrated in FIG. 12c. A comparison of FIG. 12c with FIG. 12a demonstrates that, under these conditions, signals will periodically appear simultaneously at both inputs of AND circuit 110 so that this circuit will produce an output signal whose pulse frequency, or duration, will be a function of the magnitude of the deviation of the observed signal from its desired value.

Embodiments according to the present invention could also be arranged for monitoring, in a cyclic manner, a plurality of physical quantities, such monitoring being carried out at a central monitoring station to which all of the quantities are delivered.

To this end, the quantities to be monitored are applied in succession to one set of deflection plates of the cathode-ray tube via a selector switch, while the other deflection plates of the tube are connected, also via a selector switch, to receive a DC voltage whose amplitudes varies in discrete steps, the passage of this voltage amplitude from one step to the next being synchronized with a switching of the voltage delivered to the one set of deflection plates from that representing one physical quantity to that representing the next succeeding physical quantity to be monitored. Thus, each voltage amplitude delivered to the other set of deflection plates is associated with an individual physical quantity whose representative voltage is delivered to the one set of deflection plates. When the succession of physical quantities are scanned successively at a rate equal to that of the pulses which amplitude modulate the electron beam, there appears on the cathode-ray tube screen a series of light spots defining a curve, with each light spot having a position, with respect to some reference level, which is a function of the existing value of its associated physical quantity.

In this embodiment, the mask disposed in front of the screen is provided with a slit whose form corresponds to the path which the curve defined by all of the points would follow if all of the physical quantities had their desired values, the width of the slit at each point corresponding to the permissible variation in the quantity whose associated light spot appears at that point. When the value of a particular physical quantity is outside of its acceptable limits, the associated spot will not appear in the opening defined by the slit and the inability of the photoelectric cell to detect such spot will result in the appearance of an error signal.

Figure 13:
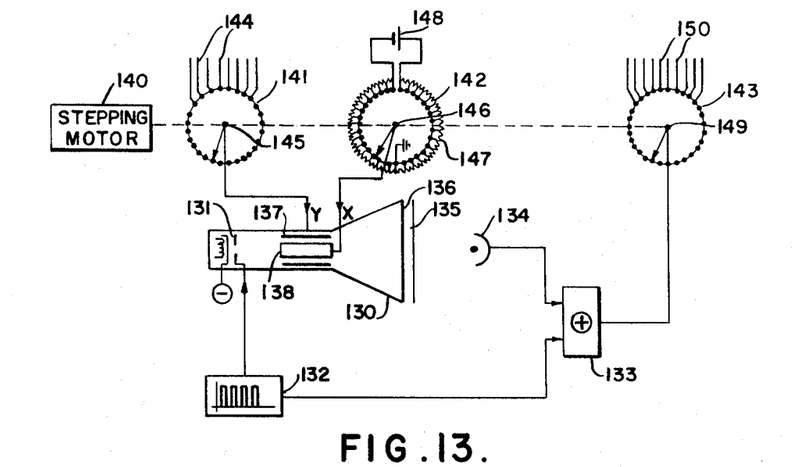
FIG. 13 is a circuit diagram of yet another embodiment of the invention.

Turning now to FIG. 13, there is shown one such arrangement according to the invention for monitoring a plurality of quantities at a central station.

The apparatus shown in this FIG. includes a cathode-ray tube 130 provided with a control grid 131 receiving pulses from a generator 132. The output of generator 132 is also connected to an Exclusive-OR circuit 133 whose other input is connected to a photoelectric cell 134 which, as in the preceding embodiments, faces a mask 135 disposed in front of the cathode-ray tube screen 136.

The tube also includes vertical deflection plates 137 and horizontal deflection plates 138.

The apparatus further includes a three-section rotary stepping switch composed of the sections 141, 142 and 143 whose respective rotary contacts 145, 146 and 149 are ganged and connected to be driven in unison by a stepping motor 140.

The fixed contacts of section 141 are connected to lines 144 each of which leads from a respective transducer (not shown) responsive to a particular quantity which is to be observed. The rotary contact 145 of this section is connected to the vertical deflection plates 137 of the cathode-ray tube.

One horizontal deflection plate 138 of the tube is connected to the rotary contact 146 of the second switch section 142, the other horizontal deflection plate being connected to ground. The stationary contacts of this section are connected to uniformly spaced points along a resistor 147 whose ends are connected across a DC voltage source 148.

Finally, the rotary contact 149 of the third section 143 is connected to the output of an Exclusive-OR circuit 133 and the stationary contacts of this third section are connected to respective output lines 150 each of which is connected to an indicating circuit (not shown) associated with a respective detector connected to one of the lines 144.

In operation, when the first stationary contact of switch section 141 is connected, by rotary contact 145, to vertical deflection plates 137, movable contact 146 of section 142 will be in such a position that a given constant amplitude DC voltage will be applied to horizontal plates 138 and there will appear on screen 136 a light spot which is disposed along a predetermined vertical line on the screen and whose vertical position corresponds to the instantaneous value of the signal being observed.

When the motor 140 advances the rotary contacts by one step, a different constant voltage will be applied to horizontal deflection plates 138, thus deflecting the cathode-ray tube electron beam horizontally, and a voltage representing a different quantity to be observed will be applied to vertical deflection plates 137.

The motor 140 could be operated at a rate such that the rotary contacts will advance one step for each pulse produced by generator 132. As a result, during each period of deflection of the electron beam across the entire face of screen 136, there will appear on the screen 136 a series of light spots defining a discontinuous curve. The slit provided in mask 135 is formed to correspond to the configuration of this curve when all of the quantities being observed have their desired values.

When one of these quantities deviates from its desired value, an output signal will be produced by the circuit 133 in a manner similar to that described previously. This output signal is transmitted via the movable contact 149 of switch section 143 of that output line 150 connected to the corresponding output circuit.

When an embodiment according to the invention is utilized in a central monitoring station in the manner described above with reference to FIG. 13, it might be desirable to obtain information not only as to whether each quantity being measured is within its acceptable tolerance range, but also the value of the quantity when it is within its tolerance.

This could be achieved, in accordance with another feature of the invention, by connecting the rotary contact of the switch conducting the voltages relating to the values of the various physical quantities to a sweep voltage circuit whose output voltage can be reset to its reference, or zero, level and is applied to the vertical deflection plates of the cathode-ray tube, and by connecting the output of the photoelectric cell to at least one pulse counter.

The sweep voltage generator, which preferably produces an output having a sawtooth waveform, is arranged so that the start of each sweep voltage cycle is synchronized with the advance of the rotary switch contact to a new position.

With this arrangement, for each quantity being monitored, the voltage produced by the sweep generator and applied to the vertical deflection plates will produce a succession of light spots extending along a vertical line. The photoelectric cell will detect each spot along this line which is disposed in the opening defined by the slit and each spot detected will be recorded by an associated pulse counter.

The sweep voltage generator is preferably connected by means of a comparison circuit so that its output voltage will be reset to a zero value immediately after that output voltage reaches a value which is equal to the value of the voltage representing the physical quantity then being observed. As a result, as long as the physical quantity has a value which is within its acceptable tolerances, the number of light spots detected by the photoelectric cell and counted by the pulse counter will be proportional to the value of that physical quantity within its tolerance range.

Such an arrangement could be provided with a plurality of pulse counters each associated with a respective physical quantity, with each counter being connected to the photoelectric cell, by means of a rotary switch, during the period when the voltage representing its associated physical quantity is being observed. Alternatively, a single pulse counter could be employed and provided with suitable switch means for causing the counter to count the light spots associated with only one selected physical quantity.

The circuit illustrated in FIG. 13 could be so modified in order to permit a determination of the location of each light spot within the tolerance range of its associated quantity.

Figure 15:
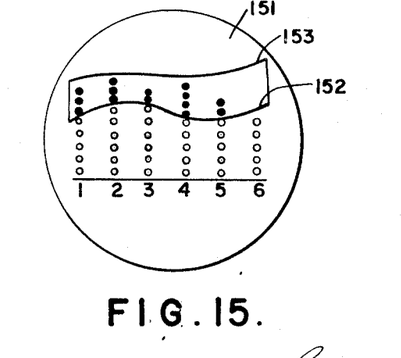
FIG. 15 is a pictorial view of one type of mask which may be employed in the apparatus of FIG. 13.

FIG. 15 shows a mask 151 which could be employed with the apparatus of FIG. 13. This mask is provided with a slit whose sides are indicated as 152 and 153.

Figure 14:
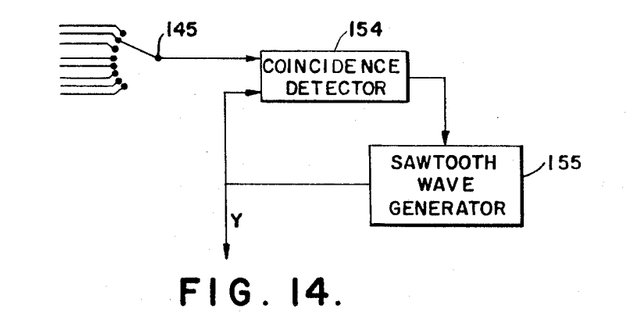
FIG. 14 is a circuit diagram of a modified form of construction of a portion of the apparatus of FIG. 13.

When it is desired to obtain an indication not only of whether the value of each quantity being observed deviates from its permissible range, but also whether the value approaches the limits of that range, while remaining within those limits, the movable contact 145 conducting the voltages representing the quantities to be monitored could be connected to a coincidence detector 54 as shown in FIG. 14. The other input for the coincidence detector is connected to the output of a sawtooth wave generator 155 whose output voltage is returned to zero by the occurrence of an output signal from detector 154. The sawtooth wave output voltage is also applied to the vertical deflection plates 137 of the cathode-ray tube of FIG. 13.

When the apparatus of FIG. 13 is modified to include the circuit of FIG. 14, the apparatus will also be modified by providing a pulse counting circuit which replaces circuit 133 and which has its input connected to photoelectric cell 134.

For each quantity being monitored, the circuit of FIG. 14 will operate to cause a vertical line of light spots to be produced on the cathode-ray tube screen. FIG. 15 shows six such vertical lines, each associated with a respective quantity being monitored. Because the output voltage from sawtooth generator 155 will progressively increase until it becomes equal to the value being monitored, the height of each vertical line, and the number of light spots which it contains, will be a function of the value of the quantity being observed at the measuring instant.

If a particular vertical line does not reach a position above the lower edge 152 of the slit in mask 151, the photoelectric cell will not deliver any light pulses. Such is the case for line number 6 shown in FIG. 15. On the other hand, when the vertical line does pass above the lower edge of the slit, as the case for lines 1 to 5 in FIG. 15, the photoelectric cell will produce, for each vertical line, a number of pulses proportional to the maximum height of the vertical line above the lower slit edge.

In certain cases, as for example in the case of vertical line No. 2 in FIG. 15, the upper extremity of the line will extend above the upper edge 153 of the slit. In this case, the counter will register the maximum number of pulses for that line and hence will indicate that the value of the associated quantity has reached the upper limit of its permissible range. The maximum number of pulses which could be produced for each quantity being measured can be determined experimentally in advance of the measuring operations.

It will be understood that the above description of the present invention is susceptible to various modifications, changes and adaptations.

We claim:

1. Apparatus for monitoring at least one physical quantity which is represented by an electrical quantity, comprising, in combination:
    a. a cathode-ray tube having a screen and arranged to produce an electron beam and to deflect such beam across said screen in a first direction at a fixed repetition rate and in a second direction, perpendicular to the first direction, by an amount proportional to the instantaneous value of the physical quantity, so as to produce, upon the screen, a visible trace representing the physical quantity;
    b. an opaque mask disposed in front of said screen and provided with a slit defining a transparent region which encompasses the path which the trace will follow across the screen for the desired value of the physical quantity and whose width corresponds to the deviations of the trace from this path due to the maximum acceptable variation of the physical quantity from its desired value;
    c. a voltage generator whose output voltage frequency is higher than the repetition rate at which the beam is deflected across the screen in the first direction, said generator being connected to said tube for modulating the intensity of the beam to cause it to be periodically blanked during a portion of each cycle of the output produced by said generator; and
    d. a photoelectric cell disposed in front of said mask and positioned for detecting the trace whenever it appears within the opening defined by said slit.

2. An arrangement as defined in claim 1 wherein said voltage generator produces an output voltage consisting of a train of pulses, which voltage blanks the beam during the intervals between pulses.

3. An arrangement as defined in claim 1 for monitoring a plurality of physical quantities in a cyclic manner, further comprising switching means having a first stage connected to said tube for causing the beam to advance across the screen in the first direction in a stepwise manner and a second stage for deflecting the beam across the screen in the second direction perpendicular to the first direction in response to successive deflection signals each proportional to a respective physical quantity and each coinciding with a respective position of the beam along the first direction.

4. An arrangement as defined in claim 3 further comprising deflection means connected between said second stage and said tube, said deflection means including a generator for producing sawtooth voltages connected to said tube for deflecting the beam in the second direction in direct response to such sawtooth voltage, there being one sawtooth voltage cycle for each successive deflection signal, and means connected to said sawtooth voltage generator for resetting its output voltage to that of the start of a sawtooth wave at the instant when the amplitude of the sawtooth voltage equals that of the corresponding deflection signal, the output of said photoelectric cell being arranged to be connected to a pulse counter.

5. An arrangement as defined in claim 1 further comprising a logic circuit connected to the output of said photoelectric cell for producing an indication whenever the trace appears on the screen in a region outside of the opening defined by said slit.

6. An arrangement as defined in claim 5 wherein said logic circuit is constituted by an Exclusive-OR circuit having one input connected to the output of said photoelectric cell and its other input connected to the output of said voltage generator.

7. An arrangement as defined in claim 1 wherein said tube is arranged to produce a plurality of electron beams and to control the deflection of each beam individually, all of the beams having their intensity modulated in unison by said voltage generator, said tube being connected to cause some of the beams to each produce, upon the screen, a trace representing a respective physical quantity and for causing at least one remaining beam to produce a trace which remains at a constant level on the screen with respect to the direction in which beams are deflected by variations in the physical quantities being monitored, said mask being provided with a plurality of slits each associated with a respective beam, and there being provided a plurality of photoelectric cells each associated with a respective slit for detecting only the trace produced by the beam associated with its respective slit.

8. An arrangement as defined in claim 7 further comprising a plurality of logic circuits each associated with a respective physical quantity being monitored, each said logic circuit having one input connected to the photoelectric cell arranged to detect the trace representing its associated physical quantity and another input connected to the photoelectric cell associated with the trace which remains at a constant level on the screen and arranged for producing an output whenever the trace representing its associated physical quantity appears on the screen beyond the opening defined by its associated slit.

9. An arrangement as defined in claim 8 wherein each said logic circuit is constituted by an Exclusive-OR circuit.

10. An arrangement as defined in claim 1 further comprising a square wave generator producing output pulses at a rage which is less than the frequency of the output produced by said voltage generator and having its output connected to said tube for deflecting the beam in the direction of the deflection produced by a signal corresponding to the physical quantity being monitored.

11. An arrangement as defined in claim 10 wherein the pulses produced by said square wave generator have an amplitude which is sufficient to deflect the beam by an amount which is substantially equal to the width of the slit.

12. An arrangement as defined in claim 10 further comprising a detection circuit connected to the output of said photoelectric cell and a phase demodulator having one input connected to the output of said detection circuit and one input connected to the output of said square wave generator.

13. An arrangement as defined in claim 1 wherein said tube is provided with a pair of vertical deflection plates connected to receive a voltage which varies in accordance with the physical quantity being monitored and a pair of horizontal deflection plates connected to receive a voltage which causes the beam to be deflected across the screen, said mask being oriented so that the width of its slit is essentially in the direction of the deflection produced by the voltage on said vertical deflection plates, said arrangement further comprising an auxiliary deflection circuit producing two sinusoidal outputs each of which is applied to a respective pair of deflection plates for deflecting the beam over a circular path across the screen.

14. An arrangement as defined in claim 13 wherein the voltages produced by said auxiliary circuit are of such an amplitude as to give such circular path a diameter which is greater than that of the width of the slit.

15. An arrangement as defined in claim 14 further comprising a detection circuit connected to the output of said photoelectric cell, a threshold detector circuit having its input connected to receive one of the voltages produced by said auxiliary circuit, and an AND circuit having one input connected to the output of said detection circuit and its other input connected to the output of said threshold detector circuit.